United States Patent
Peczalski et al.

(10) Patent No.: US 8,806,958 B2
(45) Date of Patent: *Aug. 19, 2014

(54) ULTRASONIC AIR FLOW SENSOR

(75) Inventors: Andy Peczalski, Eden Prarie, MN (US); Brian Krafthefer, Stillwater, MN (US)

(73) Assignee: Honeywell International Inc., Morristown, NJ (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/542,494

(22) Filed: Jul. 5, 2012

(65) Prior Publication Data

US 2014/0007698 A1    Jan. 9, 2014

(51) Int. Cl.
*G01F 1/66* (2006.01)
(52) U.S. Cl.
USPC ........................................ 73/861.28
(58) Field of Classification Search
CPC ............ G01F 1/667; G01F 1/662; G01F 1/66
USPC .............................. 73/861.23, 861.25–861.29
See application file for complete search history.

(56) References Cited

U.S. PATENT DOCUMENTS

| | | | |
|---|---|---|---|
| 4,970,902 A * | 11/1990 | Misumi et al. | 73/861.23 |
| 5,583,301 A * | 12/1996 | Strauss et al. | 73/861.29 |
| 2013/0327156 A1 * | 12/2013 | Peczalski et al. | 73/861.27 |
| 2014/0007698 A1 | 1/2014 | Peczalski et al. | |

OTHER PUBLICATIONS

USPTO Office Action for U.S. Appl. No. 13/494,867 dated Mar. 6, 2014.

* cited by examiner

*Primary Examiner* — Jewel V Thompson
(74) *Attorney, Agent, or Firm* — Ingrassia Fisher & Lorenz, P.C.

(57) ABSTRACT

A flow sensor includes a plurality of ultrasonic transceivers and signal processing circuitry. The transceivers are coupled to a portion of the outer surface of a duct, and each is configured to transmit ultrasonic waves into a fluid, receive ultrasonic waves, and supply sensor signals representative of the received ultrasonic waves. The signal processing circuitry is configured to supply separate excitation signals to each of the ultrasonic transceivers, receive the sensor signals supplied by each of the ultrasonic transceivers, and generate, in response to the sensor signals, a flow signal representative of fluid flow in the flow passage. Each of the excitation signals has a different phase, such that the ultrasonic waves transmitted by each of the ultrasonic transceivers at least selectively combine to propagate in an adjustable direction relative to the flow direction.

16 Claims, 5 Drawing Sheets

US 8,806,958 B2

ULTRASONIC AIR FLOW SENSOR

TECHNICAL FIELD

The present invention generally relates to flow sensors, and more particularly relates to an ultrasonic flow sensor.

BACKGROUND

Many systems include flow sensors for sensing the flow rate of a fluid in one or more system conduits. For example, many forced air heating, ventilation, and air conditioning (HVAC) systems sense air flow for energy monitoring. In many of these systems, air flow is detected using a Pitot-static tube that extends into an air duct. This type of sensor, while generally reliable, do suffer certain drawbacks. For example, these types of sensors sense air flow in only a small region of the air duct, and thus cannot accurately measure non-uniform flow. These types of sensors additionally exhibit relatively low accuracy, and are sensitive to tube obstruction.

Hence, there is a need for an air flow sensor that can sense air flow over the entire cross section of an air flow duct, exhibits relatively high accuracy over time and with temperature variations, and/or is insensitive to obstruction by dust or other particulate. In addition to these needs, there is also a desire for an air flow sensor that is relatively inexpensive to install and relatively easy to calibrate. The present invention addresses one or more of these needs.

BRIEF SUMMARY

In one embodiment, a flow sensor includes a duct, a plurality of ultrasonic transceivers, and signal processing circuitry. The duct has an inner surface and an outer surface. The inner surface defines a flow passage through which fluid may flow in a flow direction. The transceivers are coupled to a portion of the outer surface of the duct, and each is configured to transmit ultrasonic waves into the fluid, receive ultrasonic waves, and supply sensor signals representative of the received ultrasonic waves. The signal processing circuitry is in operable communication with each of the ultrasonic transceivers. The signal processing circuitry is configured to supply separate excitation signals to each of the ultrasonic transceivers, receive the sensor signals supplied by each of the ultrasonic transceivers, and generate, in response to the sensor signals, a flow signal representative of fluid flow in the flow passage. Each of the excitation signals has a different phase, such that the ultrasonic waves transmitted by each of the ultrasonic transceivers at least selectively combine to propagate in an adjustable direction relative to the flow direction.

In another embodiment, a flow sensor includes a duct, a plurality of first ultrasonic transceivers, a plurality of second ultrasonic transceivers, and signal processing circuitry. The duct has an inner surface and an outer surface. The inner surface defines a flow passage through which fluid may flow in a flow direction. The first ultrasonic transceivers are coupled to a first portion of the outer surface of the duct, and each is configured to transmit ultrasonic waves into the fluid, receive ultrasonic waves, and supply sensor signals representative of the received ultrasonic waves. The second ultrasonic transceivers are disposed upstream of the first ultrasonic transceivers, and each is configured to transmit ultrasonic waves into the air, receive ultrasonic waves, and supply second sensor signals representative of the received ultrasonic waves. The signal processing circuitry is in operable communication with each of the first and second ultrasonic transceivers. The signal processing circuitry is configured to supply separate excitation signals to each of the first and second ultrasonic transceivers, receive the first and second sensor signals supplied by each of the first and second ultrasonic transceivers, respectively, and generate, in response to the sensor signals, a flow signal representative of fluid flow in the flow passage. Each of the first and second excitation signals has a different phase, such that the ultrasonic waves transmitted by each of the first and second ultrasonic transceivers at least selectively combine to propagate in an adjustable direction relative to the flow direction.

In still another embodiment, a flow sensor includes a duct, a plurality of ultrasonic transceivers, and signal processing circuitry. The duct has an inner surface and an outer surface. The inner surface defines a flow passage through which fluid may flow in a flow direction. The ultrasonic transceivers are coupled to a portion of the outer surface of the duct, and each is configured to transmit ultrasonic waves into the fluid, receive ultrasonic waves, and supply sensor signals representative of the received ultrasonic waves. The signal processing circuitry is in operable communication with each of the ultrasonic transceivers, the signal processing circuitry configured to supply separate excitation signals to each of the ultrasonic transceivers, receive the sensor signals supplied by each of the ultrasonic transceivers, and generate, in response to the sensor signals, a flow signal representative of fluid flow in the flow passage. Each of the excitation signals has a different phase, such that the ultrasonic waves transmitted by each of the ultrasonic transceivers at least selectively combine to propagate in a direction that is perpendicular to the flow direction selectively combine to propagate in a direction that is non-perpendicular to the flow direction.

Furthermore, other desirable features and characteristics of the ultrasonic flow sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although the embodiments are described herein in the context of air flowing through a duct, it will be appreciated that the flow of various other fluids, both liquid and gaseous, may be measured using the configurations described herein.

Figure 1:
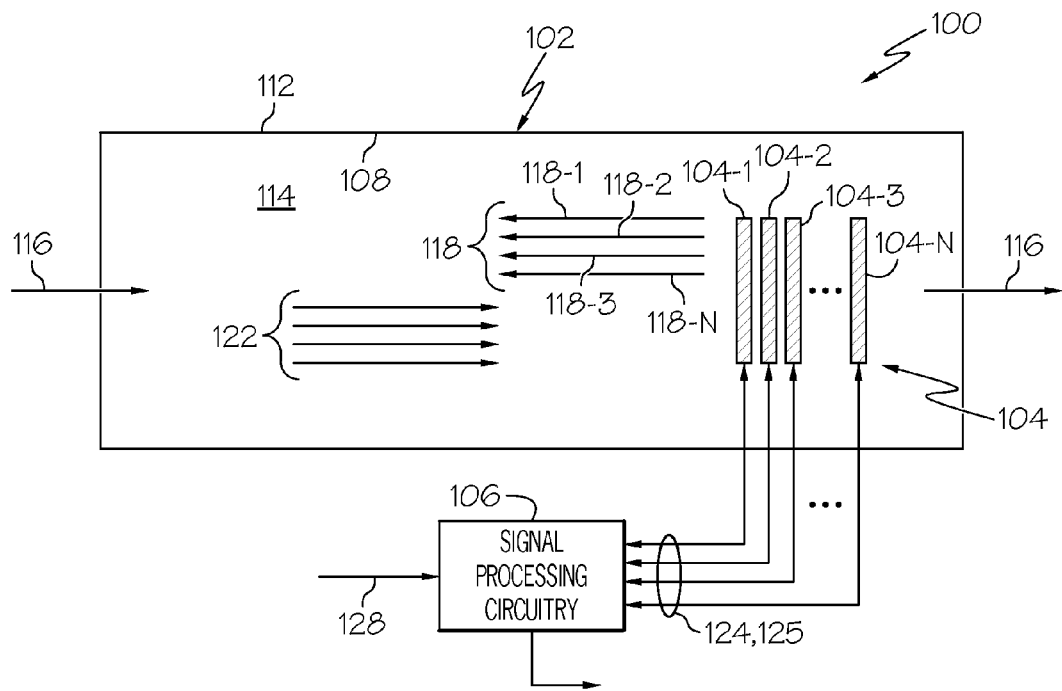
FIGS. 1 and 2 depict simplified side and end views, respectively, of one embodiment of an ultrasonic flow sensor.
Figure 2:
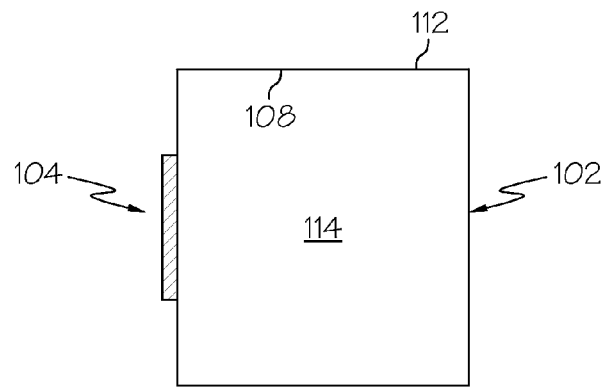

Referring now to FIGS. 1 and 2, simplified side and end views, respectively, of one embodiment of an ultrasonic flow sensor 100 are depicted. The flow sensor 100 includes an air duct 102, plurality of ultrasonic transceivers 104 (e.g., 104-1, 104-2, 104-3, . . . 104-N), and signal processing circuitry 106. The air duct 102 includes an inner surface 108 and an outer surface 112. The inner surface 108 defines a flow passage 114 through which a air may flow in a flow direction 116.

The ultrasonic transceivers 104 are each coupled to a portion of the outer surface 112 of the duct 102. The ultrasonic transceivers 104 are each configured to transmit ultrasonic waves 118 (e.g., 118-1, 118-2, 118-3, . . . 118-N) into the air. As FIG. 1 also depicts, each ultrasonic transceivers 104 are further configured to receive ultrasonic waves 122 reflected by the air and/or particulate suspended in the air. As will be described further below, the ultrasonic waves 122 may be reflected by the air due to an acoustic impedance non-uniformity caused by, for example, heating or cooling of the air. The ultrasonic transducers 104 are additionally configured to supply sensor signals 124 representative of the received ultrasonic waves to the signal processing circuitry 106.

Although the ultrasonic transceivers 104 may be variously implemented, in the depicted embodiment, each is implemented using a thin film polymer piezoelectric, such as PVDF (polyvinylidene fluoride), that is formed in the shape of a rectangle or, if the film is long enough, the air duct in a shape of a band. These rectangles or bands of PVDF may be cut to fit many different size ducts 102. In a particular preferred embodiment, the ultrasonic transceivers 104 are installed by first applying ultrasonic grease or glue (not illustrated) to the outer surface 112 of the duct 102. The bands of PVDF, which are cut to the appropriate length are then placed on or wrapped around and secured to the duct 102. In some embodiments, a non-illustrated clamp may also be disposed around and engage the thin film polymer piezoelectric bands.

The signal processing circuitry 106 is in operable communication with each of the ultrasonic transceivers 104. The signal processing circuitry 106 is configured to supply separate excitation signals 125 of differing phases to each of the ultrasonic transceivers 104. This in turn causes the ultrasonic transceivers 104 to transmit ultrasonic waves 118 of different phases. As may be readily appreciated, the phases of the excitation signals supplied to the ultrasonic transceivers 104 can be controlled such that the ultrasonic waves transmitted by each of the ultrasonic transceivers 104 combine to generate ultrasonic waves 118 at a desired angle, width, and energy distribution across the wavefront. Preferably, the phases of the excitation signals 125 are controlled such that the ultrasonic transceivers 104 generate ultrasonic waves 118 that combine to generate ultrasonic waves 118 that propagate in a direction that is non-perpendicular to, and most preferably parallel to, the flow direction 116 and that uniformly encompass the entire flow front of the air. The signal processing circuitry 106 is also configured to receive the sensor signals 124 supplied by each of the ultrasonic transceivers 104, and to generate, in response to the received sensor signals 124, a flow signal representative of air flow in the flow passage 114.

As was noted above, the ultrasonic transceivers 104 may receive ultrasonic waves 122 reflected by the air flowing in the passage 114 and/or particulate suspended in the air. Preferably, the ultrasonic waves 122 are reflected by the air flowing in the passage 114 due to an acoustic impedance non-uniformity, and more particularly a density gradient that is generated in the flowing air. The manner in which the density gradient is generated may vary, but in the depicted embodiment the gradient is generated via a non-depicted HVAC (heating, ventilation, air conditioning) system. In such an embodiment, the signal processing circuitry 106 is coupled to receive an input signal 128 representative of an HVAC system initiation. This input signal may originate, for example, from an HVAC system thermostat. The signal processing circuitry 106 is further configured, upon receipt of the input signal 128, to supply the separate excitation signals 125 to each of the ultrasonic transceivers 104. In this embodiment, flow measurements may be timed to coincide with the HVAC turn-on/turn-off cycle, when there is a temperature gradient, and thus density gradient, in the air flow. Thus, the depicted flow sensor 100, while configured as Doppler Effect type of sensor, will sense air flow even with no discontinuities, such as dust or particulate, disposed therein.

Figure 3:
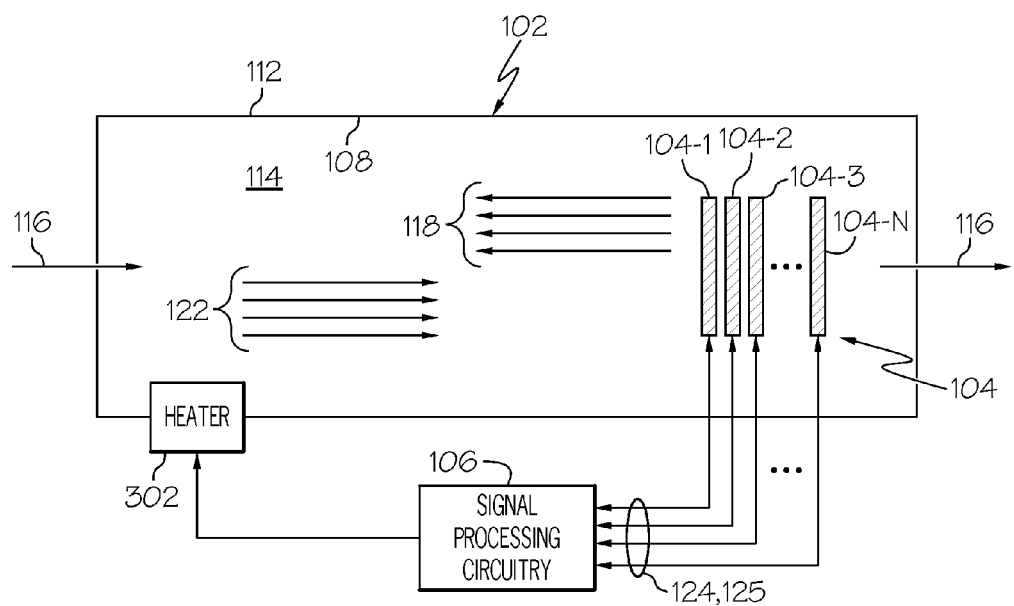
FIGS. 3 and 4 depict simplified side and end views, respectively, of another embodiment of an ultrasonic flow sensor.
Figure 4:
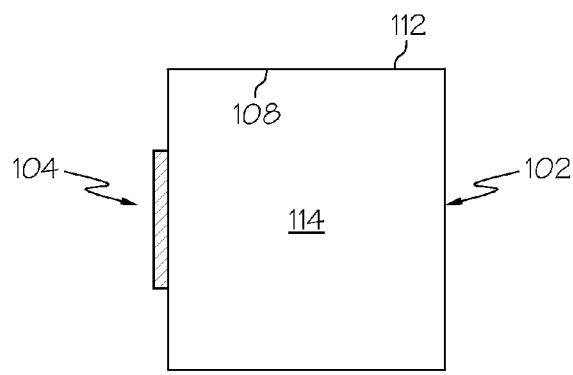

In other embodiments, such as the one depicted in FIGS. 3 and 4, the density gradient may be generated using a heater 302. The heater 302 is coupled to the outer surface 112 of the duct 102, upstream of the ultrasonic transceivers 104. The heater 302 is selectively energized, preferably, as shown, via the signal processing circuitry 106, and is configured, upon being energized, to heat the air flowing in the flow passage 114. More specifically, the heater 302 is controllably energized to quickly heat a portion of the duct 102 to which the heater 302 is coupled. This generates a temperature gradient, and thus a density gradient, in the flowing air, thereby providing a moving reflective target for the transmitted ultrasonic waves 118.

Figure 5:
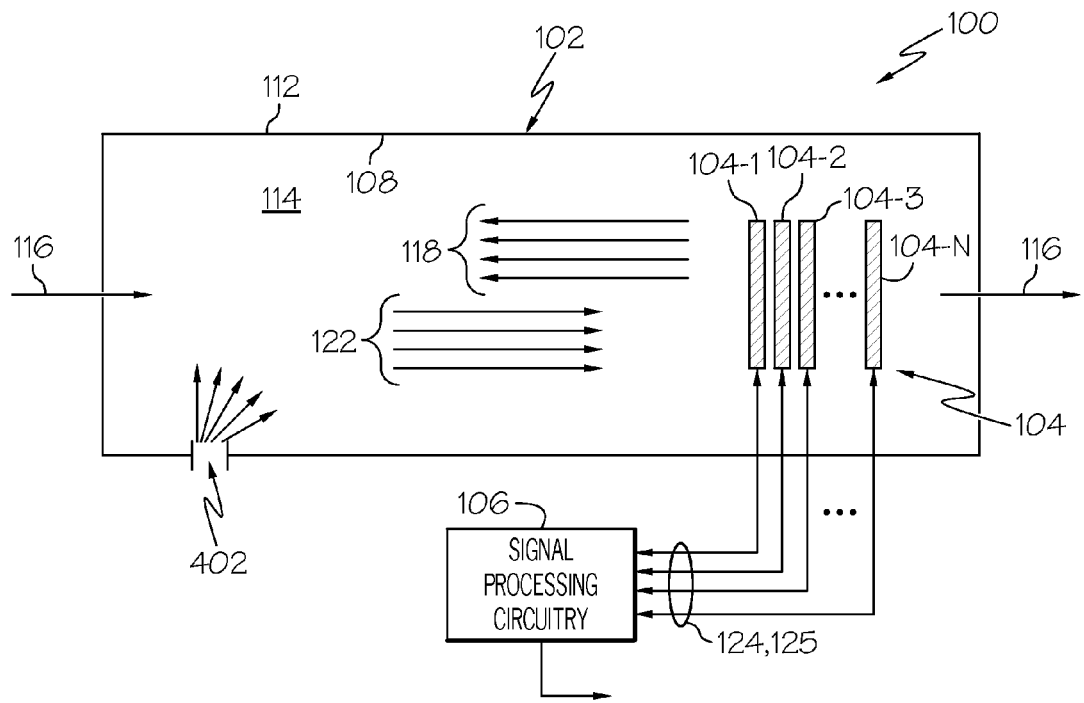
FIGS. 5 and 6 depict simplified side and end views, respectively, of yet another embodiment of an ultrasonic flow sensor.
Figure 6:
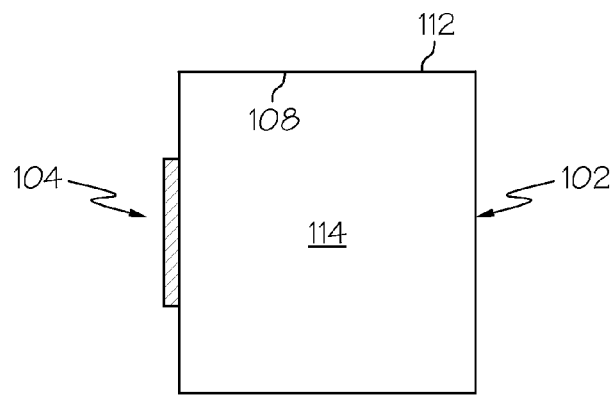

In yet another embodiment the density gradient may be generated via an opening in the duct 102. An example of such an embodiment is depicted in FIGS. 5 and 6, in which an opening 402 is formed in the duct 102 that extends between the inner and outer surfaces 108, 112 and is disposed upstream of the plurality of ultrasonic transceivers 104. With this configuration, whenever air flows in the flow passage 114, air external to the duct 102 is drawn into the flow passage 114, via the opening 402, to thereby generate the density gradient.

Figure 7:
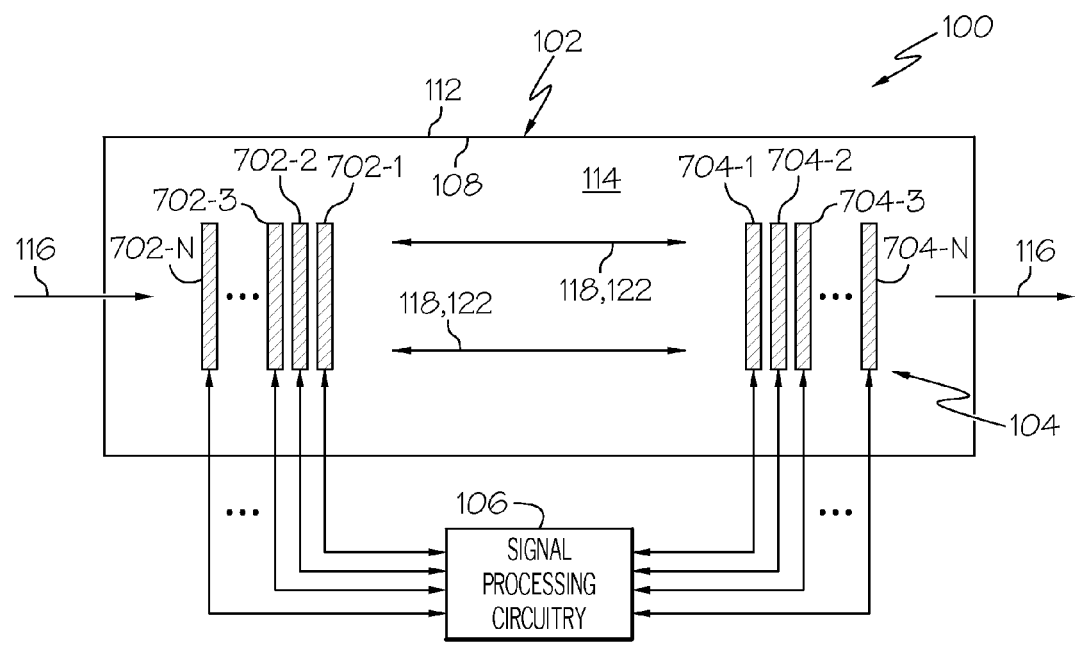
FIGS. 7 and 8 depict simplified side and end views, respectively, of still another embodiment of an ultrasonic flow sensor.
Figure 8:
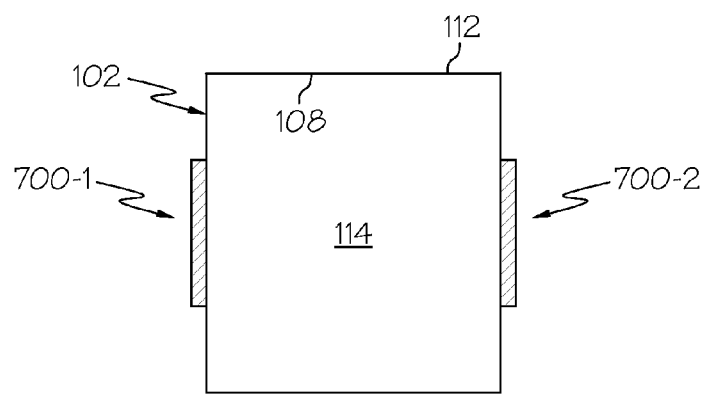

The embodiments depicted in FIGS. 1-4 are each configured as Doppler Effect type of flow sensors. However, the embodiment depicted in FIGS. 7 and 8 is configured as a time-of-flight type of flow sensor. The flow sensor 100 may be implemented as a time-of-flight type sensor if, for example, strong thermal gradient reflections cannot be generated in the air. No matter the reason for implementing the time-of-flight type flow sensor, it is seen that the flow sensor 100 includes two ultrasonic transceiver arrays 700-1, 700-2. The first ultrasonic transceiver array 700-1 is implemented using a plurality of first ultrasonic transceivers 702 (e.g., 702-1, 702-2, 702-3, . . . 702-N). The second ultrasonic transceiver array 700-2, which is disposed upstream of the first ultrasonic transceiver array 700-1, is implemented using a plurality of second ultrasonic transceiver 704 (e.g., 704-1, 704-2, 704-3, . . . 704-N).

The first and second ultrasonic transceiver 702, 704 are each coupled to a portion of the outer surface 112 of the duct 102. Each of the first and second ultrasonic transceiver 702, 704 are also configured to transmit ultrasonic waves 118 into the air that propagate in a direction that is non-perpendicular to, and preferably parallel to, the flow direction 116, and to receive reflected ultrasonic waves 122 and supply first and second sensor signals 124 representative of the received ultrasonic waves to the signal processing circuitry 106. However, the first ultrasonic transceivers 702 transmit ultrasonic waves 118 that propagate in a first direction, and the second ultrasonic transceivers 704 transmit ultrasonic waves 118 that propagate in a second direction that is opposite to that of the first direction.

Similar to the embodiment depicted in FIGS. 1-6, the first and second ultrasonic transducer arrays 700-1, 700-2 are each is preferably controlled to implement phased-array ultrasonic transceivers. Thus, the signal processing circuit 106 depicted in FIG. 7 is configured to supply separate excitation signals of differing phases and frequencies to each of the first and second ultrasonic transceiver 702, 704. This in turn causes each of the ultrasonic transceiver 702, 704 to transmit ultrasonic waves 118 of different phases. Again, however, the phases of the excitation signals supplied to the first and second ultrasonic transceiver 702, 704 are preferably controlled such that the first and second ultrasonic transceiver 702, 704 generate ultrasonic waves 118 that propagate in first and second directions, respectively, that are non-perpendicular to, and preferably parallel to, the flow direction 116 and that encompass the entire flow front of the fluid with a desirable distribution of the energy across the wavefront. An example of a desirable energy distribution is one that has the same shape as the velocity of the fluid flow i.e., is highest in the center and diminishes toward the inner surface 108 of the conduit 102.

The signal processing circuitry 106, in addition to controllably supplying excitation signals 125 to the first and second ultrasonic transceiver 702, 704, is coupled to receive the first and second sensor signals 124 supplied by the first and second ultrasonic transceiver 702, 704, and generates, using well-known techniques, a flow signal representative of fluid flow in the flow passage.

Figure 9:
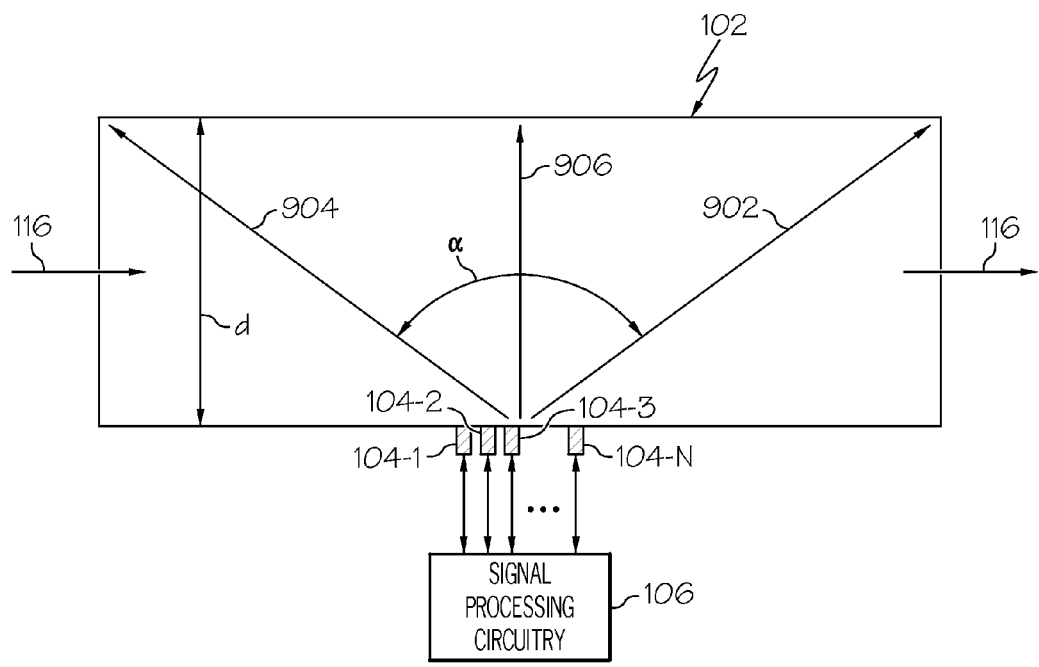
FIGS. 9 and 10 depict simplified top and end views, respectively, of another embodiment of an ultrasonic flow sensor.
Figure 10:
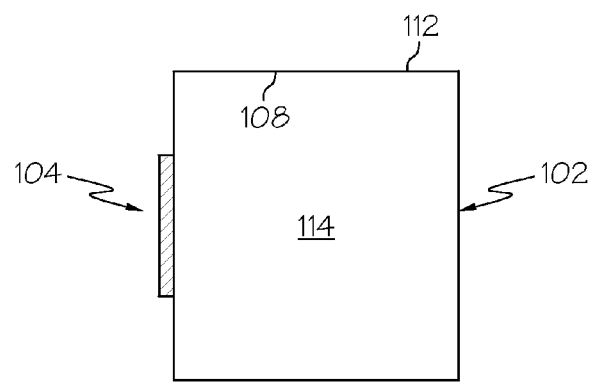

It is also possible to implement a time-of-flight type flow sensor using only a single ultrasonic transceiver array. An example of one such embodiment is depicted in FIG. 9. As with the embodiments depicted in FIGS. 1-4, this sensor 100 includes a single ultrasonic transceiver array that is implemented using a plurality of ultrasonic transceivers 104 (e.g., 104-1, 104-2, 104-3, . . . 104-N). Each ultrasonic transceiver 104 is coupled to a portion of the outer surface 112 of the duct 102, and each is configured to transmit ultrasonic waves 118. However, as FIG. 9 further depicts, the signal processing circuitry 106 controls the ultrasonic transceivers 104 to transmit ultrasonic waves 118 that selectively propagate in directions that are both perpendicular to, and non-perpendicular to, the flow direction 116. That is, the signal processing circuitry 106 controls the ultrasonic transceivers 104 to selectively transmit ultrasonic waves 602 non-perpendicular to, and in the same direction as, the flow direction 116, and to selectively transmit, at another time and with different phases, ultrasonic waves 604 non-perpendicular to, and in the opposite direction as, the flow direction 116.

The ultrasonic transceivers 104 are also configured to receive reflected ultrasonic waves and supply sensor signals 124 representative of the received ultrasonic waves to the signal processing circuitry 106. The angle at which the reflected angles are received will depend upon the roughness of and/or contaminants that may be present on the surface opposite to the transceivers 104. Therefore, the phases of each receiving transceiver 104 can be optimized by the signal processor 106 for maximum received signal. The signal processing circuitry 106 is additionally configured to determine air flow by subtracting the round-trip travel times of the transmitted ultrasonic waves 602, 604, and multiplying this difference by the cosine of the beam angle ($\alpha$) between the transmitted ultrasonic waves 602, 604. The cosine of the beam angle ($\alpha$) can be calculated using a calibration process that is described further below.

It is noted that the flow sensor arrangement depicted in FIG. 9 may also be configured to implement a Doppler Effect type flow sensor, such as those depicted in FIGS. 1-6, with additional benefit of obtaining the beam angle from the calibration process described below. The calibrated beam angle determined from the calibration process is more accurate than the beam angle calculated from the theoretical equation using the electrode phase differences, as described above. In addition, the beam angle will change, for example, if there is dust or other particulate deposited on the inner surface 112 of the air duct 102, which typically occurs after some period of use.

The embodiment depicted in FIG. 9 is preferably calibrated when no air is flowing in the duct 102. During such conditions, the signal processing circuitry 106 calculates the angle ($\alpha$) between the transmitted ultrasonic waves 602, 604 from the time of flight of ultrasonic waves that are transmitted in both the perpendicular and no-perpendicular directions 602, 604, 606. The angle ($\alpha$) depends on the ratio of the round trip time-of-flight of the waves 602 and 606 or 602 and 604. The angle ($\alpha$) is necessary for both the time-of-flight type sensor depicted in FIG. 7, and the Doppler Effect type sensor depicted in FIG. 9. In addition, the signal processing circuitry 106 determines the sound velocity in the duct 102 from the ultrasonic waves that are reflected in response to the ultrasonic transceivers 104 transmitting ultrasonic waves perpendicular to the normal flow direction 116, and based on the depicted width dimension (d) of the duct 102. The sound velocity may be used to increase the accuracy of the calculations in the signal processing circuitry 106.

In each of the embodiments depicted and described herein, operating the flow sensor 100 at the resonant frequency of the air inside the conduit will increase the sensitivity of the flow sensor 100. However, the Doppler Effect type flow sensor 100 should be operated at frequencies of about 1 MHz and that are 10-100 times larger than the resonant frequency of the duct to make the ultrasound wave as short as possible to detect the smallest particles present (if any) in the air. For the embodiment depicted in FIGS. 3 and 4, the phase and frequency of the excitation signals could be automatically adjusted to obtain the largest Doppler response signal, and thereby provide self-calibration. The optimum settings may vary with the conduit materials, depositions on the conduit walls, dimensions, and fluid type.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flow sensor, comprising:
    a duct having an inner surface and an outer surface, the inner surface defining a flow passage through which fluid may flow in a flow direction;
    a plurality of ultrasonic transceivers coupled to a portion of the outer surface of the duct, each of the ultrasonic transceivers configured to (i) transmit ultrasonic waves into the fluid, (ii) receive ultrasonic waves, and (iii) supply sensor signals representative of the received ultrasonic waves; and
    signal processing circuitry in operable communication with each of the ultrasonic transceivers, the signal processing circuitry configured to:
        supply separate excitation signals to each of the ultrasonic transceivers,
        receive the sensor signals supplied by each of the ultrasonic transceivers, and
        generate, in response to the sensor signals, a flow signal representative of fluid flow in the flow passage,
        wherein each of the excitation signals has a different phase, such that the ultrasonic waves transmitted by each of the ultrasonic transceivers at least selectively combine to propagate in an adjustable direction relative to the flow direction.

2. The flow sensor of claim 1, wherein each of the excitation signals has a different phase such that the ultrasonic waves transmitted by each of the ultrasonic transceivers at least selectively combine to propagate in a direction that is perpendicular to the flow direction.

3. The flow sensor of claim 1, wherein each of the excitation signals has a different phase such that the ultrasonic waves transmitted by each of the ultrasonic transceivers at least selectively combine to propagate in a direction that is non-perpendicular to the flow direction.

4. The flow sensor of claim 1, further comprising:
    a heater coupled to the outer surface of the duct upstream of the ultrasonic transceivers, the heater adapted to be selectively energized and configured, upon being energized, to heat the fluid flowing in the flow passage, and thereby generate a temperature gradient in the air.

5. The flow sensor of claim 1, further comprising:
    an opening formed in the duct between the inner and outer surfaces and upstream of the plurality of ultrasonic transceivers, whereby when liquid flows in the flow passage, air external to the duct is drawn into the flow passage via the opening to thereby generate a temperature gradient in the air flowing in the flow passage.

6. The flow sensor of claim 1, wherein the ultrasonic transceiver comprises a rectangular shaped thin film polymer piezoelectric strip.

7. The flow sensor of claim 6, further comprising adhesive layer disposed between the thin film polymer piezoelectric strip and the duct.

8. The flow sensor of claim 1, wherein the signal processing circuitry is adapted to receive an input signal representative of an HVAC (heating, ventilation, air conditioning) system initiation and is further configured, upon receipt thereof, to supply the separate excitation signals to each of the ultrasonic transceivers.

9. The flow sensor of claim 1, wherein:
the plurality of ultrasonic transceivers are first ultrasonic transceivers;
the flow sensor further comprises a plurality of second ultrasonic transceivers disposed upstream of the first ultrasonic transceivers, each of the second ultrasonic transceivers configured to (i) transmit ultrasonic waves into the fluid, (ii) receive ultrasonic waves, and (iii) supply second sensor signals representative of the received ultrasonic waves; and
the signal processing circuitry is in operable communication with the second ultrasonic transceivers and is further configured to:
supply separate excitation signals to each of the second ultrasonic transceivers,
receive the second sensor signals supplied by the second ultrasonic transceivers, and
generate a flow signal representative of fluid flow in the flow passage,
wherein each of the second excitation signals has a different phase, whereby the ultrasonic waves transmitted by each of the second ultrasonic transceivers combine to propagate in a second direction that is non-perpendicular to the flow direction and opposite to the first direction.

10. The flow sensor of claim 1, wherein the signal processing circuitry is further configured to control each of the ultrasonic transceivers to transmit ultrasonic waves that selectively propagate in directions that are both perpendicular to, and non-perpendicular to, the flow direction, wherein the ultrasonic waves transmitted non-perpendicular to the flow are selectively transmitted:
(i) in the same direction as the flow direction and
(ii) at another time and with different phases, in the opposite direction as the flow direction.

11. A flow sensor, comprising:
a duct having an inner surface and an outer surface, the inner surface defining a flow passage through which fluid may flow in a flow direction;
a plurality of first ultrasonic transceivers coupled to a first portion of the outer surface of the duct, each of the first ultrasonic transceivers configured to (i) transmit ultrasonic waves into the fluid, (ii) receive ultrasonic waves, and (iii) supply sensor signals representative of the received ultrasonic waves;
a plurality of second ultrasonic transceivers disposed upstream of the first ultrasonic transceivers, each of the second ultrasonic transceivers configured to (i) transmit ultrasonic waves into the air, (ii) receive ultrasonic waves, and (iii) supply second sensor signals representative of the received ultrasonic waves; and
signal processing circuitry in operable communication with each of the first and second ultrasonic transceivers, the signal processing circuitry configured to:
supply separate excitation signals to each of the first and second ultrasonic transceivers,
receive the first and second sensor signals supplied by each of the first and second ultrasonic transceivers, respectively, and
generate, in response to the sensor signals, a flow signal representative of fluid flow in the flow passage,
wherein each of the first and second excitation signals has a different phase, such that the ultrasonic waves transmitted by each of the first and second ultrasonic transceivers at least selectively combine to propagate in an adjustable direction relative to the flow direction.

12. The flow sensor of claim 11, wherein each of the excitation signals has a different phase such that the ultrasonic waves transmitted by each of the ultrasonic transceivers at least selectively combine to propagate in a direction that is perpendicular to the flow direction.

13. The flow sensor of claim 11, wherein each of the excitation signals has a different phase such that the ultrasonic waves transmitted by each of the ultrasonic transceivers at least selectively combine to propagate in a direction that is non-perpendicular to the flow direction.

14. The flow sensor of claim 1, wherein the ultrasonic transceiver comprises a rectangular shaped thin film polymer piezoelectric strip.

15. The flow sensor of claim 6, further comprising adhesive layer disposed between the thin film polymer piezoelectric strip and the duct.

16. A flow sensor, comprising:
a duct having an inner surface and an outer surface, the inner surface defining a flow passage through which fluid may flow in a flow direction;
a plurality of ultrasonic transceivers coupled to a portion of the outer surface of the duct, each of the ultrasonic transceivers configured to (i) transmit ultrasonic waves into the fluid, (ii) receive ultrasonic waves, and (iii) supply sensor signals representative of the received ultrasonic waves; and
signal processing circuitry in operable communication with each of the ultrasonic transceivers, the signal processing circuitry configured to:
supply separate excitation signals to each of the ultrasonic transceivers,
receive the sensor signals supplied by each of the ultrasonic transceivers, and
generate, in response to the sensor signals, a flow signal representative of fluid flow in the flow passage,
wherein each of the excitation signals has a different phase, such that the ultrasonic waves transmitted by each of the ultrasonic transceivers at least selectively combine to propagate in a direction that is perpendicular to the flow direction selectively combine to propagate in a direction that is non-perpendicular to the flow direction.

* * * * *